(12) United States Patent
Diehl et al.

(10) Patent No.: US 10,788,071 B2
(45) Date of Patent: Sep. 29, 2020

(54) HOLE PUNCH AND ALSO A METHOD FOR THE PIERCING OF A WORKPIECE WHICH IS PRESENT AS A FOAM MATERIAL AND/OR AS A SANDWICH MATERIAL AND ALSO A METHOD FOR THE MANUFACTURE OF THE HOLE PUNCH

(71) Applicant: PROFIL Verbindungstechnik GmbH & Co. KG, Friedrichsdorf (DE)

(72) Inventors: Oliver Diehl, Bad Homburg v.d.H. (DE); Andreas Lembach, Darmstadt (DE)

(73) Assignee: PROFIL VERBINDUNGSTECHNIK GMBH & CO. KG (DE)

( * ) Notice: Subject to any disclaimer, the term of this patent is extended or adjusted under 35 U.S.C. 154(b) by 117 days.

(21) Appl. No.: 15/958,755

(22) Filed: Apr. 20, 2018

(65) Prior Publication Data

US 2018/0238380 A1    Aug. 23, 2018

Related U.S. Application Data

(62) Division of application No. 14/485,881, filed on Sep. 15, 2014, now Pat. No. 9,976,589.

(30) Foreign Application Priority Data

Sep. 16, 2013   (DE) .................. 10 2013 218 548

(51) Int. Cl.
*F16B 39/282*  (2006.01)
*F16B 39/22*  (2006.01)
(Continued)

(52) U.S. Cl.
CPC .......... *F16B 39/282* (2013.01); *B23P 19/064* (2013.01); *F16B 27/00* (2013.01); *F16B 37/048* (2013.01); *F16B 37/065* (2013.01); *F16B 39/225* (2013.01); *F16B 19/086* (2013.01); *Y10T 29/49833* (2015.01); *Y10T 29/49835* (2015.01)

(58) Field of Classification Search
CPC .... F16B 39/282; F16B 37/048; F16B 39/225; F16B 37/065; F16B 27/00; F16B 19/086; B23P 19/064; Y10T 29/49835; Y10T 29/49833
See application file for complete search history.

(56) References Cited

U.S. PATENT DOCUMENTS

| 1,112,525 A | 10/1914 | Darling |
| 2,486,769 A | 11/1949 | Watson, Jr. |

(Continued)

FOREIGN PATENT DOCUMENTS

| DE | 2012083 A1 | 10/1970 |
| DE | 1420073 A1 | 1/1995 |

(Continued)

*Primary Examiner* — John C Hong
(74) *Attorney, Agent, or Firm* — Dickinson Wright PLLC

(57) ABSTRACT

A hole punch and a method for piercing a workpiece wherein a hole punch includes a sheet metal part and a piercing body attached thereto which carries out the piercing function and which is provided with a thread cylinder or can be provided with a thread cylinder, for example by pressing a threaded pin into a centrally arranged passage of the hole punch, wherein the hole punch can also be formed in one piece as a piercing body with a sheet metal-like flange. Furthermore a method is claimed for the manufacture of the hole punch.

7 Claims, 5 Drawing Sheets

Figure 1:
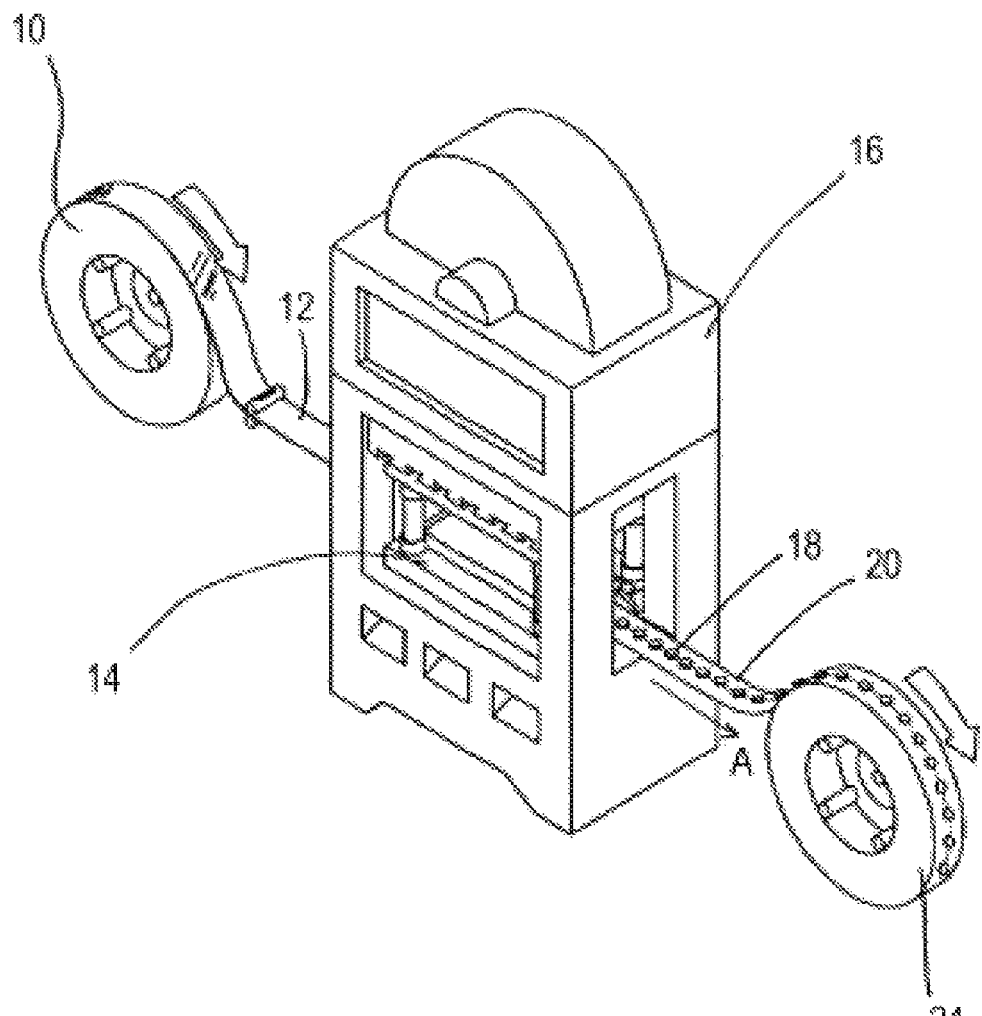

(51) Int. Cl.
  *F16B 27/00*   (2006.01)
  *B23P 19/06*   (2006.01)
  *F16B 37/06*   (2006.01)
  *F16B 37/04*   (2006.01)
  *F16B 19/08*   (2006.01)

(56) References Cited

U.S. PATENT DOCUMENTS

| | | |
|---|---|---|
| 3,281,171 A | 10/1966 | Hughes |
| 3,999,659 A | 12/1976 | Grube |
| 4,459,073 A | 7/1984 | Muller |
| 4,543,701 A | 10/1985 | Muller |
| 4,555,838 A | 12/1985 | Muller |
| 4,610,072 A | 9/1986 | Muller |
| 4,727,646 A | 3/1988 | Muller |
| 7,160,047 B2 | 1/2007 | Mueller et al. |
| 2012/0088075 A1 | 4/2012 | Diehl et al. |
| 2012/0142440 A1 | 7/2012 | Babej et al. |
| 2015/0074973 A1 | 3/2015 | Diehl et al. |

FOREIGN PATENT DOCUMENTS

| | | |
|---|---|---|
| DE | 19542790 A1 | 5/1997 |
| DE | 19848617 A1 | 4/2000 |
| DE | 102005024220 A1 | 11/2006 |
| DE | 102010047636 A1 | 4/2012 |
| EP | 0539739 A2 | 5/1993 |
| EP | 0759510 A1 | 2/1997 |
| EP | 1430229 A1 | 6/2004 |
| EP | 2634437 A1 | 9/2013 |
| GB | 1200152 A | 7/1970 |
| WO | 9501511 A1 | 1/1995 |
| WO | 0173305 A1 | 10/2001 |
| WO | 03029667 A1 | 4/2003 |

HOLE PUNCH AND ALSO A METHOD FOR THE PIERCING OF A WORKPIECE WHICH IS PRESENT AS A FOAM MATERIAL AND/OR AS A SANDWICH MATERIAL AND ALSO A METHOD FOR THE MANUFACTURE OF THE HOLE PUNCH

This patent application is a divisional application of, and claims priority to, U.S. patent application Ser. No. 14/485,881, filed Sep. 15, 2014, which claims priority to DE App. No. 102013218548.0, filed Sep. 16, 2013, both of which are incorporated herein by reference in their entireties.

The invention relates to a hole punch and also to a method of piercing a workpiece which is present as a foam material and/or as a sandwich material, and also to a method for the manufacture of the hole punch.

U.S. Pat. No. 7,160,047 describes amongst other things, novel materials consisting of composite material which is defined there as being a brittle or resilient component which consists of a material having hollow spaces or pores, such as for example plastics, wood, foams, metals which are filled with hollow bodies or plastics or another relatively soft material and are optionally present in the form of a sandwich construction, for example in the form of a one-ply or multi-ply structure with, for example, two sheet metal or plastic layers with a core of one of the above-named substances or materials.

The invention is likewise concerned with the processing of workpieces of this kind including newer materials which were not available at that time. In order to more clearly specify the type of materials the following examples can be named which is however not to be considered as a restrictive listing:

a) Foam materials which consist of metal, for example of steel, aluminum, magnesium or titanium or of alloys of these or other metals, with the foam materials having arisen through a foaming process and optionally being provided with closed or porous skins of the same material.

b) Foam materials which consist of metal, for example of steel, aluminum, magnesium or titanium or of alloys of these or other metals, with the foam materials being sintered from powder material with pore-forming substances which volatilize during sintering and also provided here with closed or porous skins of the same material if required.

c) Foam materials in accordance with a) or b) above but with cover layers of another material or of different materials in order to realize a sandwich construction.

d) Foam materials of plastic, optionally with fiber reinforcement and/or with upper or lower layers of the same plastic or of another plastic having smaller or no pores at all in comparison to the core region.

e) Sandwich materials having a core in accordance with d) above and with bonded on or adhesively attached or otherwise attached cover layers of the material with the same or different composition.

f) Sandwich material with cover layers of sheet metal materials of the same or different composition with a bonded on core of another material such as wood, cardboard, card or other materials, optionally in honeycomb form.

g) Sandwich materials with cover layers of plastic materials with the same or different composition, optionally with fiber reinforcement and with a bonded on core of another material such as wood, cardboard, card or other materials, optionally in honeycomb form.

h) Sandwich materials consisting of a plastic such as ABS (acryl nitrile butadiene styrene copolymer). Such sandwich materials can be provided with cover layers of solid ABS and a core of foam ABS, optionally with colored outer layers, likewise manufactured of ABS, with a material either being manufactured in a plurality of layers which are then bonded to one another or can be formed from the outset in one piece. Instead of manufacturing such sandwich plates from one material, the individual layers can also consist of different plastics, optionally with fiber or fabric reinforcement. Plates of such materials can be drawn by deep drawing to shaped automotive parts such as bonnets, rear doors etc.

ABS is a synthetic terpolymer which consists of three different monomers acryl nitrile, 1,3-butadiene and styrene and belongs to the amorphous thermo plastics. The quantity ratios can thereby vary from 15-35% acryl nitrile, 5-30% butadiene and 40-60% styrene.

By way of example, PLA, polycarbonates, polyester, polyethylene, polypropylene, TPO, TPR/TPE can be considered as further plastics.

Such materials are available from the company ASP-Plastics GmbH, 22145 Braak in Germany and from the company Polyone Designed Structures and Solutions LLC, Clayton, Mo., USA and are sold under the designation Royalex.

i) Panels of massive ABS or comparable plastics such as for example PLA, polycarbonate, polyester, polyethylene, polypropylene, TPO, TPR/TPE without a foam core both with and without fiber, fleece or fiber reinforcement.

An important object of the invention is to provide a hole punch and also a method for using a hole punch and a method of manufacturing a hole punch which can be rationally manufactured and used on an industrial scale in order to provide workpieces of the above-named type with holes and to provide fastener elements attached in the region of these holes.

In order to satisfy this object, a hole punch is provided in accordance with the invention for piercing a workpiece, wherein the hole punch consists of a sheet metal part and a piercing body attached thereto which carries out the piercing function and which is provided or can be provided with a thread cylinder.

With this proposal an entirely new path is followed. Through the attachment of the actual piercing body to the sheet metal part a hole punch can be provided at an extremely favorable price for once only use, which can easily be handled via the sheet metal part and in which the sheet metal part which forms a contact surface for the hole punch at the workpiece restricts the depth to which the piercing body can move into the workpiece.

Through the provision of a piercing body with a thread cylinder one can adopt a second function directly after the piercing of the workpiece, namely the function of a fastener element. Thus, the sheet metal part creates the possibility of providing, with a compact piercing body, a large contact area for the hole punch which is now acting as a fastener element, whereby the loading which occurs in operation does not lead to an undesirably high surface pressure.

The use of a fastener element which is attached to or will be attached to an auxiliary joining part in the form of a sheet metal part is admittedly known, for similar work materials from the above named U.S. Pat. No. 7,160,047 but there the bore which accommodates the fastener element is manufactured otherwise and the component assembly which is described and shown there, consisting of a fastener elements and a sheet metal part, are not suitable for the use as a hole punch, particularly since the attachment of the fastener element to the auxiliary joining part takes place simultaneously with the attachment of the two parts in a pre-manufactured hole.

In accordance with a particular variant of the invention the hole punch is present prior to use in a strip assembly with a plurality of like hole punches.

A construction of this kind makes it possible to be able to use the hole punch on an industrial scale, because the strip assembly is well suited for automatic supply to a piercing head so that for each stroke of the piercing head the strip assembly is transported further by one hole punch spacing. I.e. the sheet metal strip of the strip assembly serves as a carrier and spacer for the hole punches and is simply cut off in the piercing head.

In this respect the strip assembly can be present in a straight line or in the form of a coil.

A straight line design, i.e. an embodiment in strip form can be of advantage when a restricted number of workpieces is to be processed. The use of a strip assembly in the form of a coil has the advantage that a larger number of hole punches can be accommodated in space-saving manner and can be used in a large scale manufacturing process.

For the hole punch in accordance with the invention the piercing body can be connected to the sheet metal part by pressing, by adhesive bonding, by soldering, brazing or welding. Such methods make it possible to design the manufacture of the hole punches in accordance with the invention in a rational manner, since they can be manufactured as a rule from right cylindrical piercing bodies and a sheet metal strip, with the sheet metal strip serving as a transport device for the piercing bodies and being subsequently divided up to form the individual hole punches consisting of a sheet metal part and a piercing body.

The piercing body is preferably secured to the sheet metal part in a manner secure against rotation. In this way, the area or the shaping of the sheet metal part can be exploited for the attachment of the hole punch to the workpiece in a manner secure against rotation. This is of advantage when the thread cylinder of the hole punch is subsequently used for the attachment of a further component to the workpiece, either by use of a bolt which is screwed into a female thread cylinder or by the use of a nut which is screwed onto a male thread provided at the piercing body.

The sheet metal part and/or the piercing body can be provided with means providing security against rotation.

For this, a plurality of possibilities is available. The means providing security against rotation can be formed by features of shape of the sheet metal part such as bent down corners of the sheet metal part, the shape or contour of the sheet metal part, the shaping of the side edges of the sheet metal part and/or raised features, recesses or holes of the sheet metal part.

The means providing security against rotation can moreover be formed by features of shape of the piercing bodies, such as longitudinal ribs at the envelope surface of the piercing body or a grooved or ribbed or polygonal or non-circular outer shape of the piercing body. Such shapes can also be straightforwardly used with a piercing die having a simple right cylindrical bore, because the piercing body is as a rule selected with a length to the sheet metal part which is significantly shorter than the thickness of the workpiece and thus no danger exists that the shape of the piercing body which is used just once leads to damage to the die button, which is used many times.

As an alternative to the above indicated possibilities the means providing security against rotation could also be formed by an adhesive. Suitable adhesives are well known in the field of fastener elements and frequently consist of a material which first hardens under the application of pressure. The components of the adhesive can be accommodated in small capsules and can first mix and react when pressure is exerted.

It is particularly favorable when the piercing body is formed by a fastener element which is either provided with an internal thread or with a shaft part having an external thread which projects away from the piercing body remote from the sheet metal part or is itself used to carry out the piercing function.

Such fastener elements are excellently suited to be secured by a tubular rivet section or by suitable undercuts to a sheet metal part by riveting and/or by pressing in, i.e. they can be present as a rivet element or as a piercing and rivetingt element or as a press-in element.

Furthermore, so-called weld elements can be used as piercing bodies, i.e. nut-like or bolt-like elements which are provided with welding points which enable them to be welded to a sheet metal part or to a sheet metal strip.

The invention furthermore includes a method for the attachment of a fastener element to a workpiece which is at least partly formed of foam material such as plastic, aluminum, magnesium or steel and is optionally present in a composite with one or more further components or materials and/or which is formed from sandwich materials of all kinds and the most diverse compositions, for example, such as those having a core of foam material such as cardboard, card or wood, wherein a hole punch, consisting of a sheet metal part and a piercing body secured thereto, is driven with the piercing body to the fore against a first side of the workpiece while the workpiece is supported at its oppositely disposed side by a piercing die the hole of which is selected suitably for the cross-sectional shape of the piercing body and hereby a piercing slug of the material of the workpiece is cut out, the sheet metal part, is brought into contact against the said first side and is optionally pressed into the latter in order to bring features providing security against rotation provided at the sheet metal part and/or at the pierced body into engagement with the workpiece.

In this method, the hole punch is only used once in order to pierce a hole through the workpiece and remains in the workpiece in order to serve as a fastener element.

The above recited method can also be automated in a favorable manner if a plurality of hole punches are supplied in a strip assembly to a piercing head which is operated in strokes and which for each stroke separates one hole punch from the strip assembly and pierces the workpiece with it.

When the strip assembly consists of a sheet metal strip and a plurality of piercing bodies attached thereto, the sheet metal strip can be subdivided in the piercing head into individual sheet metal sections which are each secured to a piercing body.

The method can also be further developed so that the piercing head simultaneously serves, on separating the hole punch from the strip assembly, for shaping of the sheet metal part, for example, to generate features of shape which form a security against rotation with the workpiece.

The method of the invention is preferably carried out in a press.

A procedure of this kind is suitable for mass production of components. The use of such piercing heads is however not restricted to the use in a press. Instead of this, a piercing head could be carried or actuated by a robot which moves the piercing head in the direction towards the die button or vice versa. Force-actuated tongs can also be sued.

The press can also be equipped with a progressive tool which, for each stroke of the press, carries out a plurality of operations in different stations of the progressive tool, with a piercing head being used in each station or in a plurality of stations of the progressive tool.

The method can also be so further developed, that the piercing slug is removed in the same stroke of the piercing head or in a second stroke of the piercing head by means of a further plunger which is moved through a bore of the hole punch, i.e. of the sheet metal part and the piercing body.

The invention also includes a method for the manufacture of a strip assembly consisting of a plurality of like hole punches, wherein a strip of sheet metal drawn off from a carrier is supplied to a tool which secures the piercing bodies at regular intervals along a longitudinal axis of the sheet metal strip to the latter.

This method can be particularly favorably carried out when the sheet metal strip having a plurality of hole punches is cut into length or rolled up into a coil.

The manufacturing process for the sheet metal strip having a plurality of piercing bodies can be effected in a progressive tool operating in strokes, which carries out a plurality of operations for each stroke.

This process also makes it possible to carry out shape-giving work at the sheet metal strip, for example the punching out of holes in the sheet metal strip which serve for security against rotation at the workpiece and/or of the manufacture of slits and/or notches in the sheet metal strip which then serve for the later transport in the piercing head or for the later subdivision in the piercing head. Furthermore, it can be favorable to ensure an improved rolling up behavior by shaping of the sheet metal strip. For example, U-shaped bars or folds can be produced between the sheet metal parts which can be separated from one another which ensure a stable coil.

The invention will subsequently be explained in more detail with reference to embodiments and to the drawings in which are shown:

FIG. 1 a perspective representation of a press for the manufacture of a strip assembly of the hole punches in accordance with the invention, FIG. 2 a perspective representation of a strip assembly manufactured in FIG. 1 and of a hole punch in accordance with the invention which has been separated from it, FIGS. 3A-3E a hole punch in accordance with the invention in a perspective view from below (FIG. 3A), in a perspective view from above (FIG. 3B), in a plan view on the lower side (FIG. 3C), in partly sectioned view (FIG. 3B) in accordance with the arrow 3D in FIG. 3B and in a partly sectioned view (FIG. 3E) in accordance with the section line 3E in FIG. 3C and FIGS. 4A-4C three phases of the use of a hole punch in accordance with the invention.

Referring to FIG. 1 it is shown there how a sheet metal strip 12 drawn from a carrier 10 is used in a tool 14 of a press 16, shown here as a four column press, for the manufacture of a strip assembly 20 consisting of a plurality of like hole punches 18. For this purpose, a plurality of piercing bodies 22 which are first shown on their own in FIG. 2A are supplied to the tool 14 and are secured at regular spacings along the longitudinal axis A of the sheet metal strip 12 to the latter. This can take place using corresponding setting heads (not shown) in the tool 14.

The press 16 or the tool 14 which is contained therein can be so designed that for each stroke of the press a plurality of piercing bodies 22 are secured to the sheet metal strip 12 and the sheet metal strip 12 is then transported further as a whole by the effective width of the tool 14. Alternatively, a progressive tool can be used for this purpose (as shown here), which not only attaches one or a plurality of piercing bodies 22 to the sheet metal strip 12 for each stroke of the press 16 but rather itself also carries out certain work on the sheet metal strip 12. Such work can include a pre-piercing and/or a conical deformation of the sheet metal strip 12 around the pierced hole, which is for example the case for the attachment of piercing bodies in accordance with the so-called clamping hole riveting process.

In other words, the tool 14 can be a progressive tool operating in strokes which carries out a plurality of operations for each stroke. The transport length of the sheet metal strip 12 between each stroke corresponds to an integral multiple of the spacing of the individual hole punches 18, with the number depending on the design of the progressive tool.

The sheet metal strip 12 manufactured in this way with the apparatus of FIG. 1 and having a plurality of hole punches 18 can then be cut-up into lengths after or in the press 16 or, as shown in FIG. 1, can be rolled up into a coil 24.

The press 16 of FIG. 1 is simply one example for the possible attachment of the piercing bodies 22 to a sheet metal strip 12. When the piercing bodies are present in the form of weld elements then they can be welded onto the sheet metal strip individually or in a multiple arrangement in a suitable apparatus.

When using the strip assembly 20 of hole punches 18, the strip assembly 20 is supplied to a piercing head (not shown) irrespective of whether the strip assembly is present in individual lengths or in the form of a coil. For each working stroke of the piercing head the piercing head separates one hole punch 18 from the strip assembly 20, as schematically shown at the left hand side of FIG. 2. One can see from FIG. 2, that the individual hole punches 18 are secured in the strip assembly 20 only via centrally arranged connection webs 26, with the webs 26 being bounded on both sides by approximately U-shaped cuts 28 of the sheet metal strip 12 from the longitudinal side 30, 32 of the sheet metal strip 12 and in this example are also provided with a notch 34. Furthermore, one can see that the corners 36 of the hole punch 18 are bend downwardly in order to form claws 38 which engage into the material of workpiece 40 in order generate a high quality security against rotation.

Figure 2:
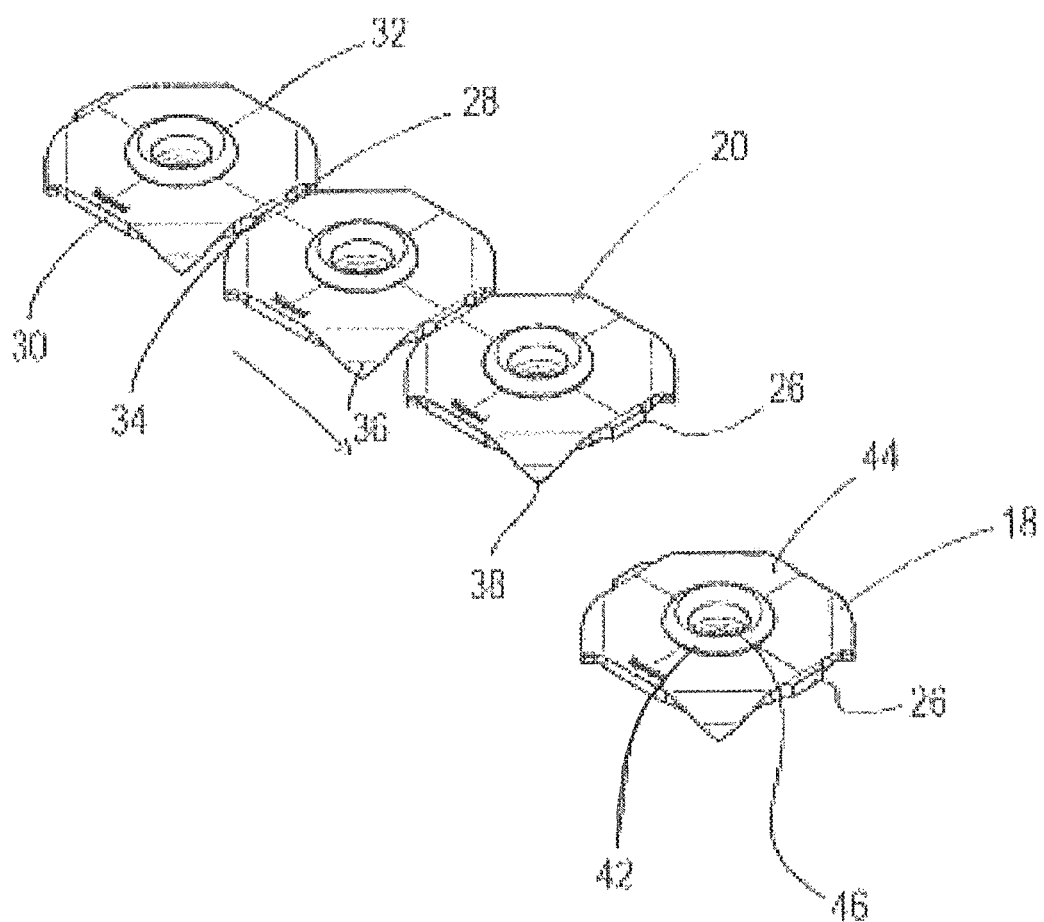
Figure 3A:
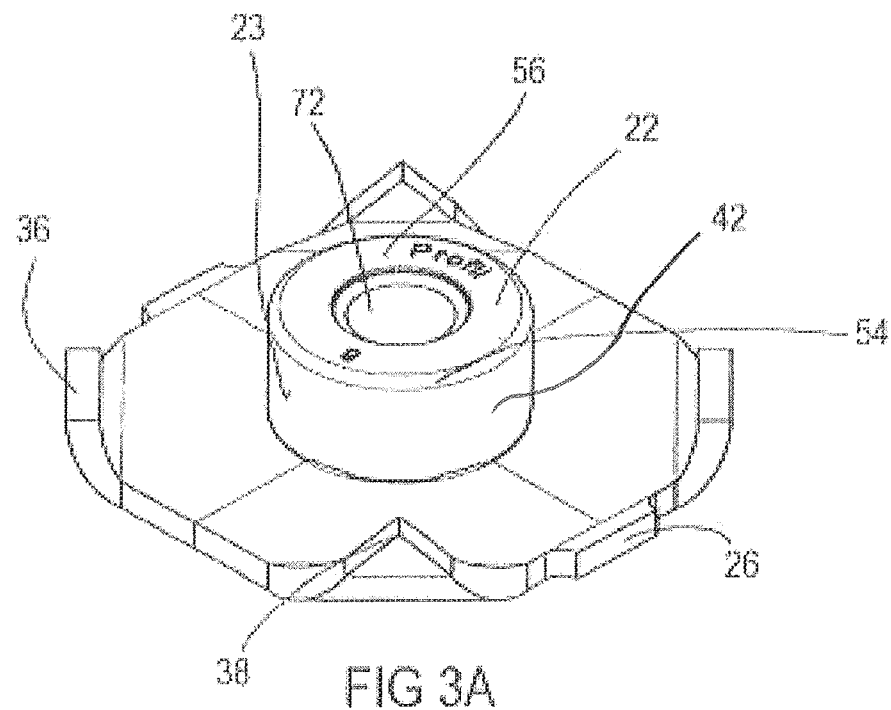
Figure 3B:
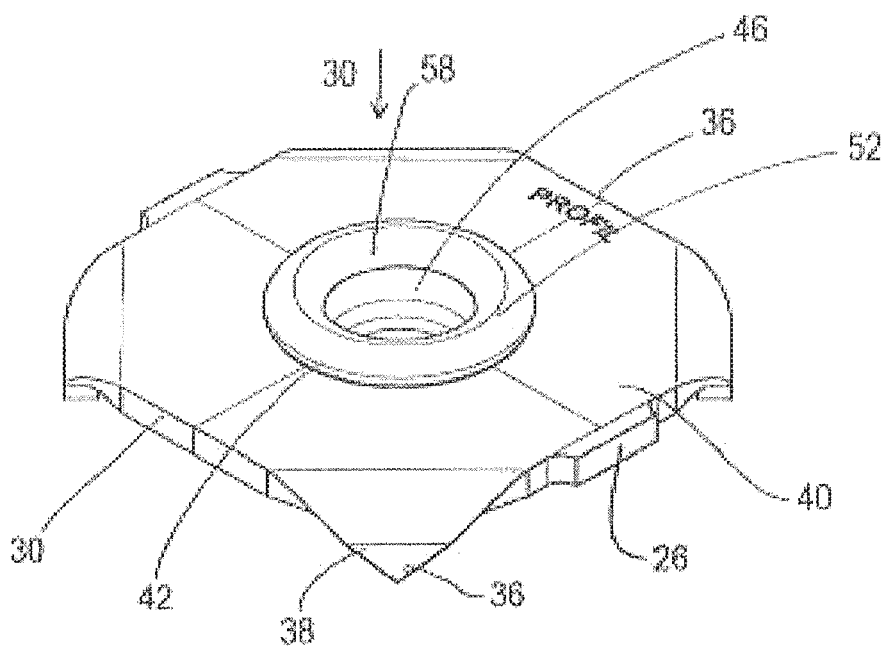
Figure 3C:
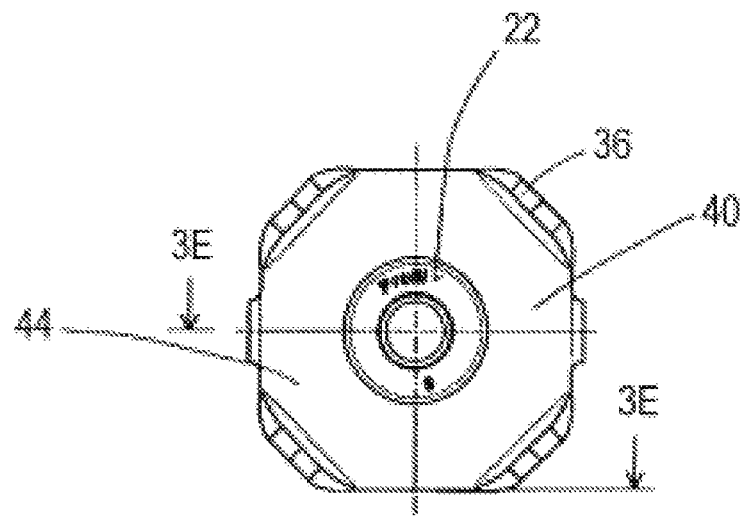
Figure 3D:
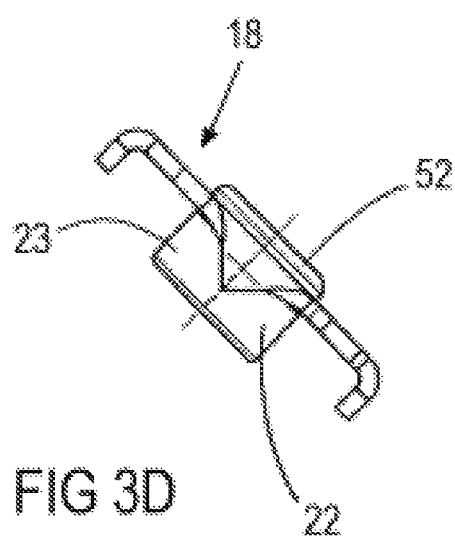
Figure 3E:
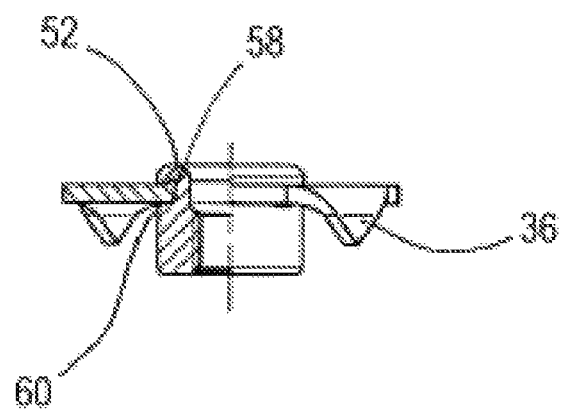

As can likewise be seen from FIG. 2 the sheet metal part 44 has corners 36 bent in the direction of the nut body 23. These corners 36 serve as security against rotation. The transmission of large forces to the relatively weak foam material is also ensured via the large contact area at the sheet metal part.

With reference to the FIGS. 3A to 3E the piercing bodies in the form of an RSN element can be seen in the riveted form with the sheet metal part. The RSN element has a cylindrical body part 23 which is circular in plan view with a small radius 54 at the free end face 56, this radius 54 should be as small as possible in order to improve the piercing characteristics of the free end face 56. At the side remote from the free end face the RSN element has a rivet section 52 which, in the starting state, i.e. prior to the fastening of the element 42 to the sheet metal part 44 is tubular but has here been reshaped into a rivet bead 58. Around the rivet section 52 there is a sheet metal contact surface 60, with features providing security against rotation (not shown) being provided at the sheet metal contact surface 60, or in the region of the transition from the rivet section 52 into the sheet metal contact surface 60. These features providing security against rotation can for example take the form of ribs which are however not visible here. These features providing security against rotation bring about a security of rotation at the sheet metal part 44, whereby the piercing body 22 is secured to the sheet metal part 44 in a manner securing against rotation. As the sheet metal part 44 is firmly clawed to the workpiece, in this example by the downwardly bent corners 36, the piercing body 22 is thus secured to the workpiece 62 (FIG. 4) via the sheet metal part 44 in a manner securing against rotation.

The piercing body 22 is provided here with an internal thread 46 so that a further component (not shown) can later be secured to the workpiece 62 and indeed by a threaded bolt which is screwed into the thread 46 from the side remote from the sheet metal part 44 so that the further component is clamped between the head of the bolt and the side of the workpiece remote from the sheet metal part. That is to say is effectively clamped to the workpiece 62 by a clamping load exerted between the head of the bolt and the sheet metal part 44. A security against rotation of the sheet metal part relative to the workpiece 62 cannot only be achieved by corners 36 of the sheet metal part 44 but rather, alternatively or in addition to this, by the shaping of the contour of the sheet metal part 44, the shaping of the side edges of the sheet metal part 44 and/or raised portions, recesses or holes of the sheet metal part. Such features providing security against rotation can be considered, because the punching of the piercing body into the workpiece is also associated with a certain pressing of the sheet metal part into the corresponding surface of the workpiece, so that an adequate material engagement takes place in order to ensure the security against rotation.

It is also conceivable to provide means providing security against rotation by features of shape (not shown) of the piercing body 22, such as longitudinal ribs at the envelope surface of the piercing body, a grooved or ribbed or polygonal or non-circular outer form of the piercing body.

The method for the attachment of the fastener element 42 to a workpiece which consists at least in part of a foam material such as plastic, aluminum, magnesium and/or steel and which is optionally present in a composite with one or more further components or materials and/or which is formed from sandwich materials of all kinds and diverse compositions, for example also those with a core of foam material, cardboard, card, or wood will now be described with reference to FIGS. 4A to 4C.

Figure 4A:
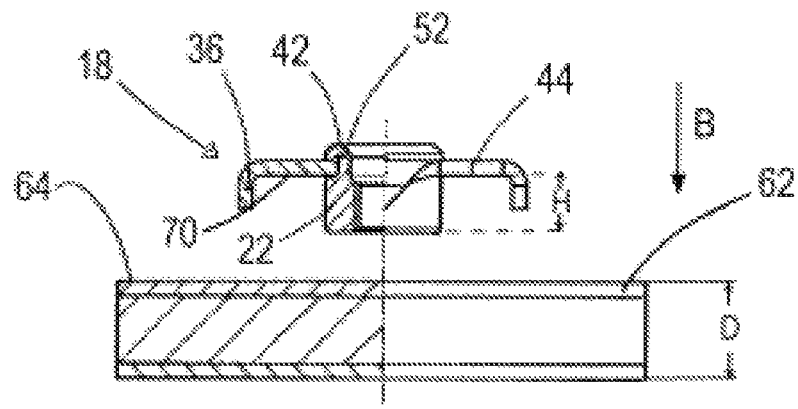
Figure 4B:
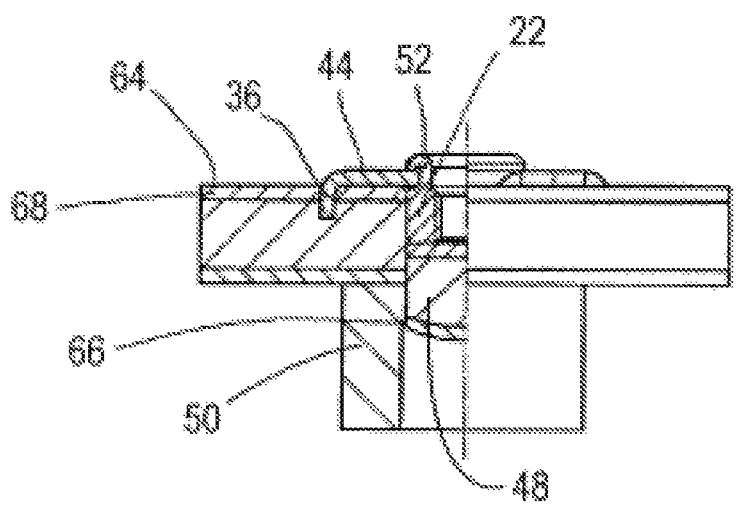
Figure 4C:
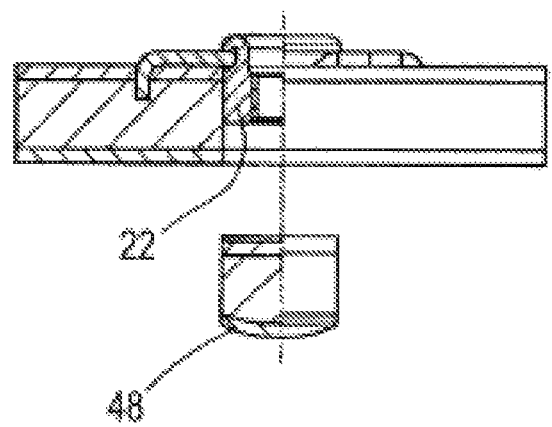

In accordance with FIG. 4A a hole punch 18 in accordance with the invention and in accordance with FIGS. 2A to 2E is driven with the piercing body 22 to the fore against a first side 64 of the workpiece 62 in the arrow direction B while the workpiece in accordance with FIG. 4B is supported at its oppositely disposed side by a piercing die 50 the hole 66 of which is selected to suit the cross-sectional shape of the piercing body. In this way a piercing slug 48 is generated from the material of the workpiece 62 which, in FIG. 4B, has not yet been fully pressed out of the workpiece 62. The sheet metal part 44 is so firmly pressed against the workpiece 62 that the bent down corners 36 penetrate into the upper cover layer 68 of the workpiece 62 and there serve for the security against rotation. I.e. the sheet metal part 44 is brought into engagement at the said first side 64 and is optionally pressed into the latter and the means providing security against rotation provided at the sheet metal part 44 and/or at the piercing body 22 are brought into engagement with the workpiece 62.

One notes, that the axial height H of the piercing body 22, which is measured below the contact surface 70 of the sheet metal part 44 from the sheet metal part 44 to the free end of the piercing body 22, is smaller than the total thickness D of the workpiece. Depending on how this height/thickness ratio is selected and depending on which specific material is used for the workpiece it can transpire that the piercing slug 48 already fully drops out of the workpiece in the stage of FIG. 4B, as shown in FIG. 4C. Should this not transpire, because the said height/thickness ratio of the material does not permit this, then the piercing slug 48 can be pressed out by means of a follow-up plunger which is moved through the threaded bore of the piercing body 22. The follow-up hole punch 18 can be used in the same stroke of the insertion apparatus when a spring-loaded press part is used in the (not shown) piercing head in order to actuate the hole punch 18 and to move the plunger (not shown) thus removing the slug in the same stroke of the insertion device including the piercing head.

Alternatively to this, a plunger can be used to remove the piercing slug 48 in a second stroke of the tool, which also takes place here through the central passage 72 of the hole punch 18 and the piercing body 22. The finished workpiece is then shown in FIG. 4C.

The setting head of the insertion device can be built up similarly to a piercing head which is used in a press in order to transport "nuts on wire" and to punch them into a workpiece. Nuts on wire relates to rectangular elements which are pressed onto two parallel wires and for each stroke of the press are cut through in order to punch individual rectangular elements into the workpiece. However, the piercing head does necessarily have to be used in a press, but rather it can also be carried by a robot or by force-actuated tongs (both not shown) which move the piercing head in the direction towards a die button.

Although it is preferred, in accordance with the invention, to secure individual piercing bodies to a sheet metal strip and to subsequently subdivide this, it should also be mentioned that a hole punch can also be formed in one piece as a piercing body with a sheet metal-like flange. Such hole punches can, for example, be manufactured in a cold heading process.

In other words, in the specific embodiment of FIG. 1, rivet elements 42 of the present applicant in the form of an RSN element are riveted as piercing bodies 22 into a sheet metal strip 12, with the individual hole punches 18, which each consist of a sheet metal part 44 and a piercing body 22 carrying out the piercing function secured to it, which is or can be provided with a thread cylinder 46. After the riveting in process the hole punches 18 are not present individually but rather are wound up as strips into a coil 24. This coil then serves as a belt for being drawn into the piercing head (not shown) during insertion of the elements into the foam material.

For each stroke of this piercing head the element is accordingly separated. The punching in process takes place via the nut element 42 as a piercing body.

Depending on the thickness ratio of the material and the nut, the slug 48 (FIG. 4) is pressed completely out or remains sticking in the die button 50 (FIG. 4) or must be expelled by a second stroke by means of a plunger (not shown) which is moved through the thread 46 of the nut 42 or is expelled in the same stroke by means of a follow-up plunger (not shown).

An RSN element is only one example for an existing nut element which can be used for the purpose of the invention. Almost any known rivet nut element can be considered of which the body part 23 has an internal thread 46 and a shape at the side remote from the rivet section 52 which is suitable as a piercing body. For example, a modified RND element of the present applicants could be used if the body part is made cylindrical and executed with a smaller cross-section or, in other words, if the V-shaped groove of an RND nut, which surrounds the rivet section at the sheet metal contact surface, were to be integrated in an RSN element. In this way the rivet bead by means of which the nut element is secured to the sheet metal part or to the sheet metal strip can be made shallower or flatter because it can be hidden in the V-shaped recess which arises when the sheet metal material is received in the V-shaped groove.

Furthermore, nut elements can be used which are present as press in elements, for example an RSU element of the present applicants. RSU elements and their processing can be seen from EP-A-759510.

Bolt elements can also be used which are known as rivet elements or as press in elementsm providing the head part of the bolt is designed as a piercing body. For example, bolt elements of this kind are SBF rivet bolts of the present applicants. The SBF element is for example described in U.S. Pat. No. 4,555,838 and in U.S. Pat. No. 4,459,073. The SBF element and the method for the attachment of the element are moreover set forth in the U.S. Pat. No. 4,543,701 and in the U.S. Pat. No. 4,727,646. An improved version of the SBF bolt can be found in EP-B-1430229.

The use of a bolt element is admittedly associated with the disadvantage that the workpiece must first be indented or indeed pierced by the shaft part of the bolt element before the head part or the side of the flange remote from the rivet section can be used as a piercing tool. This is, however, entirely possible with some materials. With materials in which the indenting or piercing with the shaft part of the bolt element cannot be considered, a hollow element can be used as a piercing body which is riveted, welded or secured otherwise to the sheet metal part, and a threaded bolt having suitable features providing security against rotation (for example knurled ribs and a countersunk head (similar to a pressed in wheel bolt) can be pressed into the hollow element after the piercing of the workpiece. With an arrangement of this kind the threaded bolt can also serve to punch out any not yet removed piercing slug from the workpiece.

As an example of the material of the sheet metal part all sheet metal steels in a deep drawing quality or somewhat harder and sheet metal parts of aluminum alloys can be named. As an example for piercing bodies all materials can be named as a material for the piercing rivets in all embodiments which achieve the strength values of class 8 in accordance with the ISO standard to a cold deformation, for example a 35132 alloy in accordance with DIN 1654. Aluminum alloys, in particular those of higher strength, for example AlMg5 can be used for the piercing rivets. Fastener elements of higher strength magnesium alloys such as for example AM50 can also be considered.

REFERENCE NUMERAL LIST 10 carrier
12 sheet metal strip
14 tool
16 press
18 hole punch
20 strip assembly
22 piercing body
23 body part
24 coil
26 connection webs
28 U-shaped cut
30 longitudinal side
32 longitudinal side
34 notch
36 corners
38 claws
40 workpiece
42 fastener element
44 sheet metal part
46 thread
48 piercing slug
50 die button
52 rivet section
54 radius
56 end face
58 rivet bead
60 sheet metal contact surface
62 workpiece
64 upper side
66 hole
68 cover layer
70 contact surface
72 passage
A longitudinal axis
B arrow direction
H axial height
D thickness of workpiece

The invention claimed is:

1. A method for manufacturing a composite strip assembly of a plurality of like hole punches comprising: supplying a plurality of piercing bodies to a tool of a press, drawing a sheet metal strip off from a carrier and supplying it to the tool, and permanently securing the piercing bodies to separately formed sheet metal parts of the sheet metal strip at regular spacings along a longitudinal axis of the sheet metal strip.

2. A method in accordance with claim 1, wherein the sheet metal strip having plural hole punches is one of cut into lengths including a plurality of the sheet metal parts and rolled up into a coil.

3. A method in accordance with claim 1, wherein the tool is a progressive tool operating in strokes which carries out a plurality of operations for each stroke.

4. A method in accordance with claim 3, wherein the plurality of operations include attachment of a plurality of piercing bodies for each stroke of the progressive tool.

5. A method in accordance with claim 4, in which shaping work is simultaneously carried out at the sheet metal strip in the progressive tool.

6. A method in accordance with claim 5, further including forming claws on the sheet metal parts configured to secure the sheet metal parts against rotation relative to a workpiece via the shaping work.

7. A method in accordance with claim 1, further including securing the piercing bodies against rotation relative to sheet metal parts.

* * * * *